United States Patent
Lühmann et al.

(10) Patent No.: US 6,536,749 B1
(45) Date of Patent: Mar. 25, 2003

(54) PNEUMATIC SUSPENSION

(75) Inventors: Cord Lühmann, Buxtehude (DE); Thorsten Höppner, Hamburg (DE); Oliver Jurk, Hamburg (DE)

(73) Assignee: Phoenix AG, Hamburg (DE)

(*) Notice: Subject to any disclaimer, the term of this patent is extended or adjusted under 35 U.S.C. 154(b) by 0 days.

(21) Appl. No.: 09/857,985
(22) PCT Filed: Oct. 6, 2000
(86) PCT No.: PCT/DE00/03526
§ 371 (c)(1), (2), (4) Date: Jun. 13, 2001
(87) PCT Pub. No.: WO01/26921
PCT Pub. Date: Apr. 19, 2001

(30) Foreign Application Priority Data

Oct. 15, 1999 (DE) .......................... 199 49 995

(51) Int. Cl.⁷ ................................ F16F 9/04
(52) U.S. Cl. ................ 267/64.19; 267/220; 267/64.28; 267/64.24
(58) Field of Search ............ 267/64.11, 64.19, 267/64.27, 64.28, 64.24, 220, 64.23; 188/322.13, 322.15, 322.16, 322.17, 322.18, 322.19, 322.22

(56) References Cited

U.S. PATENT DOCUMENTS

| | | | |
|---|---|---|---|
| 4,493,481 A | * 1/1985 | Merkle | ..... 267/64.24 |
| 4,722,516 A | 2/1988 | Gregg | |
| 4,934,667 A | 6/1990 | Pees et al. | |
| 5,460,354 A | 10/1995 | Easter | |
| 5,690,319 A | * 11/1997 | Robinson et al. | ..... 267/64.19 |
| 5,996,980 A | * 12/1999 | Frey et al. | ..... 267/64.27 |
| 6,257,605 B1 | * 7/2001 | Zernickel et al. | ..... 267/220 |
| 6,412,798 B2 | * 7/2002 | De Fontenay et al. | ..... 267/220 |

FOREIGN PATENT DOCUMENTS

| | | |
|---|---|---|
| DE | 2 064 751 | 8/1972 |
| DE | 29 04 522 | 8/1980 |
| DE | 36 43 073 | 6/1988 |
| DE | 195 08 980 | 6/1996 |
| DE | 196 14 476 | 10/1997 |
| DE | 197 53 637 | 6/1998 |
| DE | 197 04 434 | 8/1998 |
| DE | 198 26 480 | 1/1999 |
| DE | 298 23 508 | 9/1999 |

* cited by examiner

Primary Examiner—Christopher P. Schwartz
Assistant Examiner—Melanie Torres
(74) Attorney, Agent, or Firm—Collard & Roe, P.C.

(57) ABSTRACT

A pneumatic suspension, has at least the following components, an air-spring cover, air-spring piston, air-spring bellows in the form of axial bellows or transverse bellows which form a first air-spring loop, a vibration damper and a connection to the chassis. The pneumatic suspension has an articulated component located on the air-spring cover in the vicinity of the air-spring bellows. The component allows pivotal displacements when under pressure and forms a second air-spring loop which extends substantially in a radial direction. It also relates to advantageous variants of the articulated component, both for the axial bellows with an external guide and for the transverse bellows without an external guide. It relates to the use of a supporting bearing with a connection to the axial bellows. The pneumatic suspension is used in particular for the front axle of a motor vehicle.

23 Claims, 4 Drawing Sheets

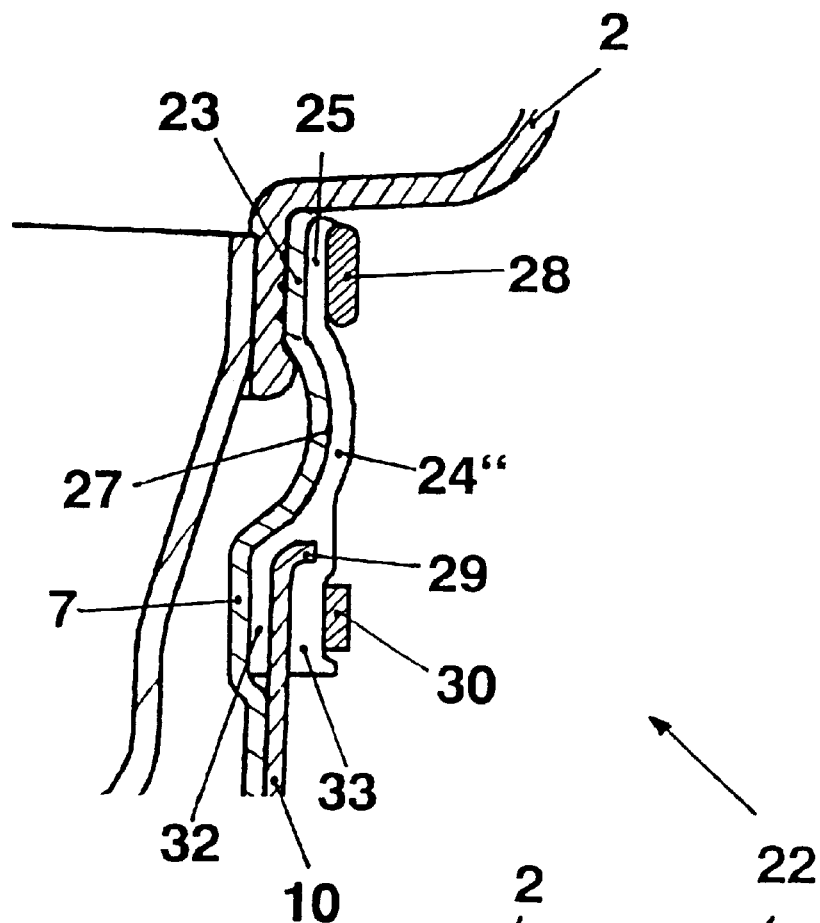
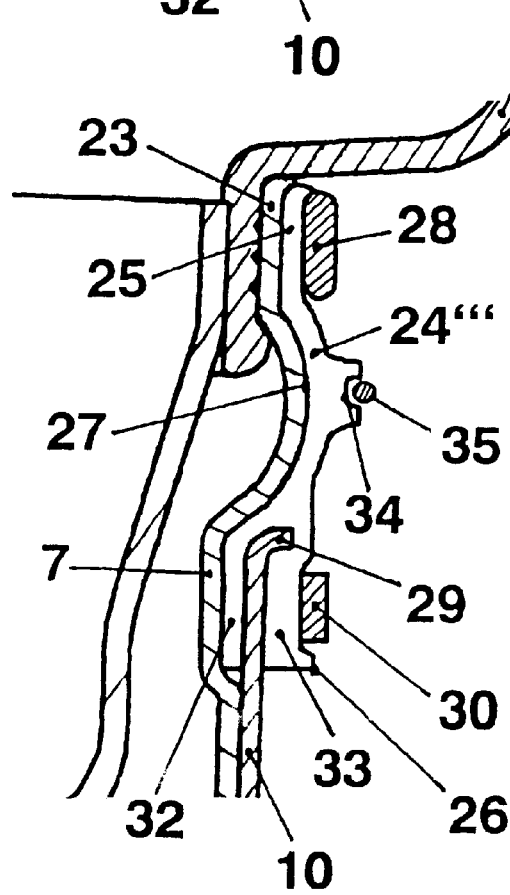

_US 6,536,749 B1_

PNEUMATIC SUSPENSION

CROSS REFERENCE TO RELATED APPLICATIONS

Applicants claim priority under 35 U.S.C. §119 of German Application No. 199 49 995.0 filed Oct. 15, 1999. Applicants also claim priority under 35 U.S.C. §120 of PCT/DE00/03526 filed Oct. 6, 2000. The international application under PCT article 21(2) was not published in English.

The invention relates to a pneumatic suspension system (1) as defined in the introductory part of patent claim 1.

A pneumatic suspension system according to the basic type as specified in said part of the claim, comprising a pneumatic suspension cover, a pneumatic suspension piston and a pneumatic suspension bellows, as the important components of the pneumatic suspension module, is described, for example in the published patent documents DE-C-195 08 980; DE-A-197 53 637; and DE-A-198 26 480. Such a pneumatic suspension system makes use of a vibration damper (shock absorber) that is in contact with a tie-up connecting it to the chassis.

The pneumatic suspension bellows, which is made of elastomer material and capable of rolling off on the roll-off surface of the pneumatic suspension piston with formation of a pneumatic suspension loop, is in most cases provided with an embedded reinforcement in the form of an axial bellows (DE-A-36 43 073) or a cross-layered bellows (DE-A-29 04 522), whereby an outer guide is preferably present when an axial bellows is employed.

Now, the problem within the framework of an advanced development of the invention is to provide a pneumatic suspension system in which the pneumatic suspension bellows is tied to the pneumatic spring over, and to make provision that three-dimensional movements of the site in which the pneumatic spring module is tied to the chassis, are made possible without the occurrence of any resetting moments.

Said problem is solved according to the characterizing part of claim 1 in that an articulated component is mounted within the closer proximity of the zone where the pneumatic spring bellows is tied to the pneumatic suspension bellows said component allowing pivotal displacements specifically with formation of a second pneumatic suspension loop substantially extending in the radial direction.

Useful variations of the invention are specified in claims 2 to 23.

Figure 1:
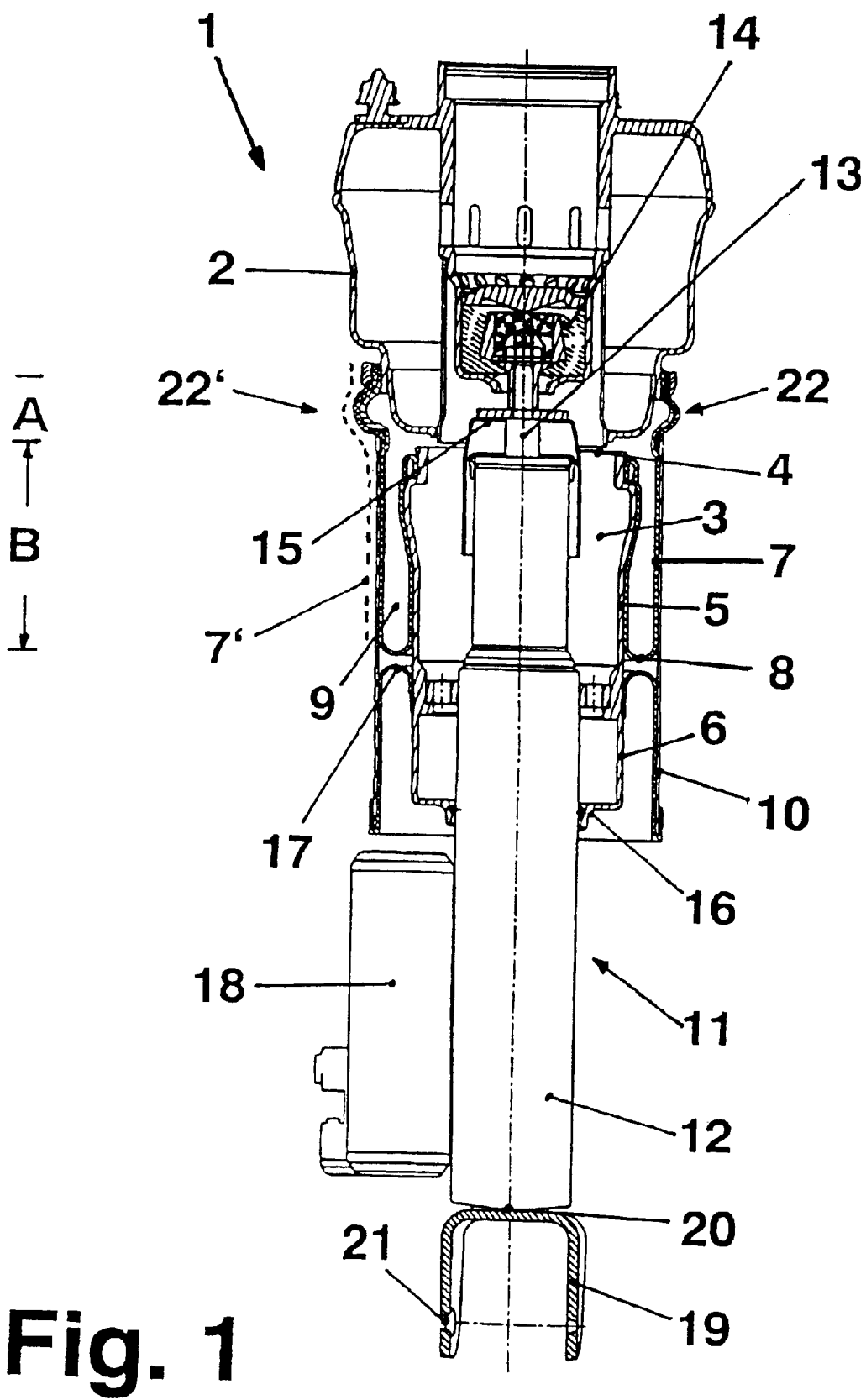

Now, the invention is explained in the following with the help of exemplified embodiments and by reference to schematic drawings, in which:

FIG. 1 shows a pneumatic suspension system in two variations, specifically with an axial bellows and an external guide, and with a cross-layered bellows without the external guide (dashed lines); and FIGS. 2 to 6 each show a detail view of a supporting bearing five variations with respect to an axial bellows without the external guide.

The following list of reference numerals is applicable to said figures:
1 Pneumatic suspension system
2 Pneumatic suspension cover (pneumatic suspension pot, pressure container)
3 Pneumatic suspension piston (roll-off piston, immersing piston
4 Face area of the pneumatic suspension piston
5 Roll-off surface of the pneumatic suspension piston
6 End zone of the pneumatic suspension piston
7 Pneumatic suspension bellows (axial bellows)
7' Pneumatic suspension bellows (cross-layered bellows)
8 First pneumatic suspension loop (rolling fold)
9 Interior of pneumatic suspension system
10 External guide
11 Vibration damper
12 Container tube
13 Piston rod
14 Damper bearing
15 Stop buffer
16 Sealing joint
17 Rolling seal
18 Backpack module (ADS module)
19 Chassis tie-up
20 Site of tie-up to container tube
21 Site of chassis tie-up
22 Articulated component with formation of a second loop for the axial bellows
22' Articulated component with formation of a second loop for the cross-layered bellows
23 End of pneumatic suspension bellows (axial bellows) within the zone of the pneumatic suspension cover
24 Supporting bearing
24' Supporting bearing
24" Supporting bearing
24'" Supporting bearing
25 First end of supporting bearing
26 Second end of supporting bearing
27 Common contact area of pneumatic suspension bellows and supporting bearing
28 Fastening means on pneumatic suspension cover
29 End flange of external guide
30 Fastening means for second end of supporting bearing
31 Reinforcement attached in form of a textile material
32 Inside end of supporting bearing
33 Outside end of supporting bearing
34 External groove of supporting bearing
35 Reinforcement attached in the form of a ring-shaped support element.

FIG. 1 shows a pneumatic suspension system 1 for the front axle of a motor vehicle. The important components of the pneumatic suspension module are comprised of the pot-shaped pneumatic suspension cover 2 with tie-up possibilities for the body of the vehicle; the pneumatic suspension piston 3, whose face area 4 is arranged opposite the pneumatic suspension cover; as well as the pneumatic suspension bellows 7 and 7', respectively. In said pneumatic suspension system, the pneumatic suspension bellows connects the pneumatic suspension cover and the pneumatic suspension piston, using fastening means (for example clamping elements), specifically with enclosure of an interior space 9 of the pneumatic suspension system, said interior space having an elastic volume. As the pneumatic suspension bellows is being compressed, a first pneumatic suspension loop 8 is formed that is capable of rolling off on the roll-off surface 5 of the pneumatic suspension piston.

The pneumatic suspension bellows is provided with an embedded reinforcement in the form of an axial or cross-layered bellows in most cases. The pneumatic suspension system 1 is embodied in this conjunction in two variations, specifically with an axial bellows 7 with the external guide 10, as well as with a cross-layered bellows 7' (dashed lines) without an external guide.

Furthermore, the pneumatic suspension system 1 has a vibration damper 11 that comprises a container tube 12 and a piston rod 13. The piston rod is in this connection joined with the core area of the pneumatic suspension cover 2 and with the damper bearing 14 in a fixed manner, and immerses in the container tube in a sliding way. Furthermore, the vibration damper 11 is equipped with a stop buffer 15, which at the same time is forming a chamber for the head area of the container tube 12.

The container tube 12 of the vibration damper 11 is surrounded by the pneumatic suspension piston 3 by sections and has in this connection a lateral tie-up zone, which jointly with the end zone 6 of the pneumatic suspension piston 3 is forming a sealing joint 16.

Within the clear zone of the container tube 12 of the vibration damper 11, a backpack module 18 particularly in the form of an ADS-module (=adaptive damping system) is present in most cases, said backpack module projecting beyond the outer periphery of the end zone 6 of the pneumatic suspension piston 3.

In order to prevent impurities from penetrating the dynamic zone of the pneumatic suspension bellows 7, a rolling seal 17 is present in the exemplified embodiment of the axial bellows with the external guide, said seal being located between the end zone 6 of the pneumatic suspension piston 3 and the external guide 10. It is possible also to employ a protective sleeve (DE-A-197 53 637) instead of using the rolling seal.

Finally, the pneumatic suspension system 1 has a chassis tie-up specifically comprising a tie-up point 20 for the tie-up to the container tube 12 of the vibration damper 11, as well as a tie-up point 21 for the tie-up to the chassis.

Now, in conjunction with the problem specified above, the pneumatic suspension system 1 as defined by the invention is characterized in that an articulated component 22 and 22', respectively, is mounted within the closer proximity A of the point at which the pneumatic suspension bellows 7 or, respectively, 7' is tied to the pneumatic suspension cover 2. Said articulated component allows swiveling movements under pressure, specifically with formation of a second pneumatic suspension loop that substantially extends in the radial direction. Within its remaining zone B, the pneumatic suspension bellows only has the usual rolling fold 8.

The articulated component 22, or 22' is now explained in greater detail in the following with the help of a number of exemplified embodiments.

FIGS. 2 to 6 show the pneumatic suspension bellows 7 in the form of an axial bellows that comprises over its entire area A and B (FIG. 1), including the fastening zone, a reinforcement located at both ends of the bellows in the form of axially extending reinforcing threads. Reference is made, for example to published patent document DE-A-36 43 073 with respect to details of said reinforcement.

Figure 2:
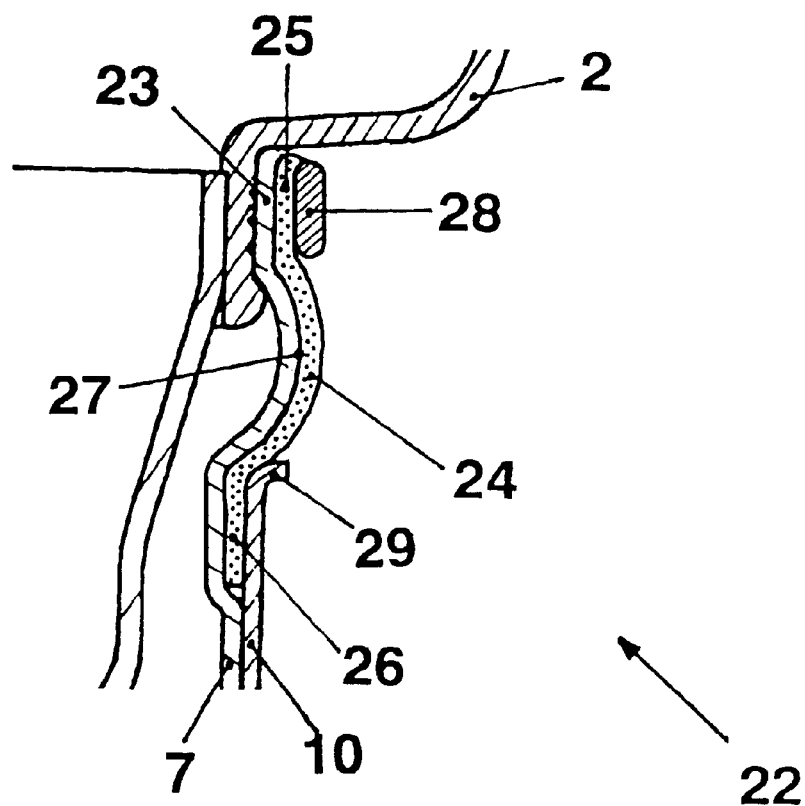
Figure 3:
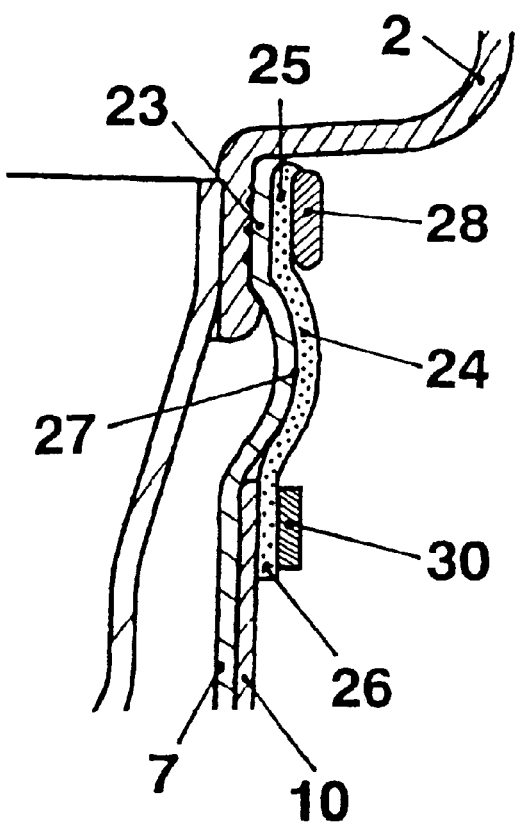

The articulated component 22 comprises the pneumatic suspension bellows 7 and a supporting bearing 24 (FIGS. 2, 3) with the two supporting bearing ends 25 and 26, said supporting bearing being arranged within the articulation zone A (FIG. 1) on the outer wall of the pneumatic suspension bellows, extending all around said wall. The supporting bearing consists in this connection of a material that, in addition to the articulation function assures a limitation of the expansion as well. The axial bellows is in this way prevented from expanding under pressure to an extent up to failure. Particularly the following variations are employed with respect to the material of the supporting bearing:

The supporting bearing consists exclusively of an elastomer material or a thermoplastic elastomer (TPE), for example in the form of a molded rubber component (FIG. 5);

it exclusively consists of a textile material preferably in the form of a woven fabric (FIGS. 2, 3);

it consists of an elastomer material or a thermoplastic elastomer comprising a reinforcement applied to its outer side, for example in the form of a molded rubber component with a reinforcement 31 made of textile material, or in the form of a ring-shaped support element 35 installed in an outer groove 34 of the supporting bearing 24''' (FIG. 6).

The pneumatic suspension bellows 7 and the supporting bearing 24, 24', 24'', and 24''', respectively, form a total composite of which the common contact surface 27 is free of adhesion.

The end 23 of the pneumatic suspension bellows 7 and the first end 25 of the supporting bearing 24, 24', 24'', and, respectively, 24''', are anchored on the pneumatic suspension cover 2 by means of one single fastening means 28, for example with the help of a clamping element.

Various variations of embodiment are available with respect to the fastening of the second end 26 of the supporting bearing 24, 24', 24'', and, respectively, 24'''. Said variations are introduced in greater detail as follows:

The external guide 10 is at the same time the fastening means for securing the second end 26 of the supporting bearing 24 in that the relevant end of the supporting bearing is clamped between the pneumatic suspension bellows 7 and the external guide 10 when pressure is admitted, preferably in conjunction with an outwardly directed end flange 29 of the external guide (FIG. 2).

Figure 4:
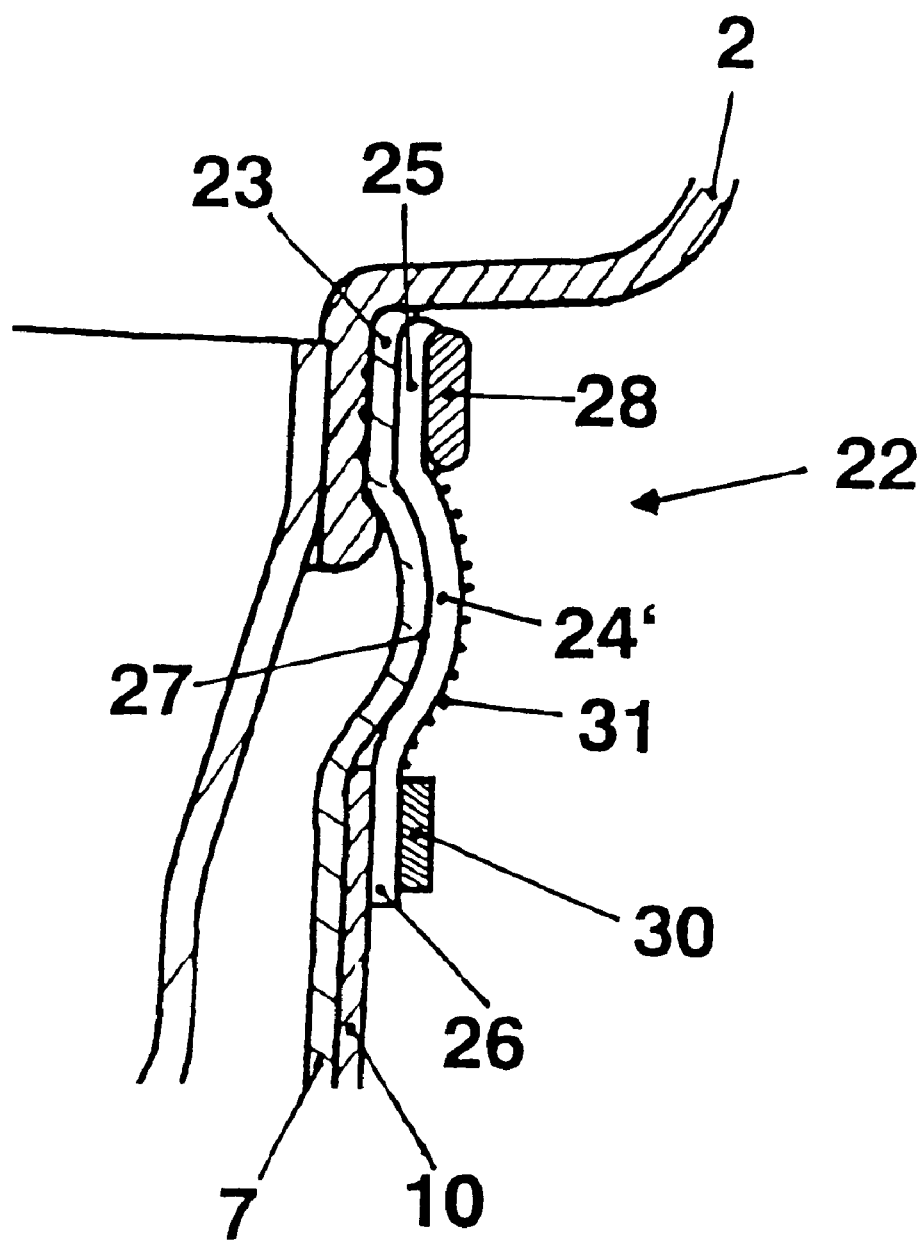

The second end 26 of the supporting bearing 24 and, respectively 24' is secured on the external guide 10 with the use of an additional fastening means 30, for example by means of a clamping element, specifically in a way such that the relevant end of the supporting bearing comes to rest exclusively between the fastening means 30 and the external guide (FIGS. 3, 4).

The second end 26 of the supporting bearing 24'' and, respectively 24''' has a slot-shaped recess extending all around for receiving the external guide 10, specifically with formation of an inner end 32 and an outer end 33, whereby the inner end is located between the pneumatic suspension bellows 7 and the external guide 10, whereas the outer end comes to rest between the external guide and the fastening means 30, preferably in conjunction with an outwardly directed end flange 29 of the external guide (FIGS. 5, 6).

Within the framework of another exemplified embodiment, the pneumatic suspension system 1 according to FIG. 1 shows a pneumatic suspension bellows 7' in the form of a cross-layered bellows (dashed lines), whereby the pneumatic suspension bellows comprises within the zone B of the bellows the usual reinforcement in the form of crossed thread reinforcements. Reference is made, for example to published patent document DE-A-29 04 522 with respect to such a reinforcement.

Within the framework of a one-piece overall composite of the pneumatic suspension bellows 7' and the articulated component 22', the articulation zone A has a different structure versus the remaining zone B of the bellows, preferably in conjunction with another structure of the reinforcement. In this connection, the articulated component 22' comprises a reinforcement that is embedded and/or applied to the outer side, said reinforcement preferably consisting of a textile material in the form of a coiled, woven or knitted material. The external guide can be dispensed with in the present case.

What is claimed is:

1. A pneumatic suspension system (1) consisting of at least the following components,
   a pot-shaped pneumatic suspension cover (2) having a damping bearing (14) integrated in its core area;
   a pneumatic suspension piston (3) comprising
      a face area (4) located opposite the pneumatic suspension cover (2);
      a lateral roll-off surface (5); and
      an end zone (6) that is removed farthest from the face area (4);
   a pneumatic suspension bellows (7, 7') made of elastomer material, which bellows
      connects the pneumatic suspension cover (2) and the pneumatic suspension piston (3) with each other with the use of fastening means, and encloses an interior space (9) of the pneumatic suspension system with an elastic volume, whereby the pneumatic suspension bellows is capable of rolling off on the roll-off surface (5) of the pneumatic suspension piston (3) with formation of a first pneumatic suspension loop (8), and whereby, furthermore,
      the pneumatic suspension is provided with an embedded reinforcement in the form of an axial bellows (7) or a cross-layered bellows (7'), whereby an external guide (10) is present when an axial bellows is employed;
   a vibration damper (11) comprising
      a container tube (12) that is surrounded by the pneumatic suspension piston (3) at least by sections and has a lateral tie-up zone forming jointly with the end zone (6) of the pneumatic suspension piston (3) a sealing joint (16),
      a piston rod (13) connected with the core area of the pneumatic suspension cover (2) and the damper bearing (14) in a fixed manner, said piston rod immersing in the container tube (12) in a sliding manner; and
   a chassis tie-up (19) with tie-up points (20, 21) for the tie-up to the container tube (12) of the vibration damper (11), and to the chassis; and
   an articulated component (22, 22') is mounted on the pneumatic suspension cover (2) within the closer proximity (A) of the tie-up of the pneumatic suspension bellows (7, 7'), said articulated component allowing swivel movements specifically with formation of a second pneumatic suspension loop substantially extending in the radial direction.

2. The pneumatic suspension system according to claim 1, wherein the articulated component (22) comprises the pneumatic suspension bellows (7) and a supporting bearing (24, 24', 24", 24''') arranged within the articulation zone (A) on the outer wall of the pneumatic suspension bellows, extending all around said wall, said supporting bearing consisting of a material assuring in addition to an articulation function a limitation of expansion as well.

3. The pneumatic suspension system according to claim 2, wherein the supporting bearing (24") exclusively consists of an elastomer material or a thermoplastic elastomer.

4. The pneumatic suspension system according to claim 2, wherein the supporting bearing (24) exclusively consists of a textile material in the form of a fabric.

5. The pneumatic suspension system according to claim 2, wherein the supporting bearing consists of an elastomer material or a thermoplastic elastomer comprising an embedded reinforcement made of a textile material.

6. The pneumatic suspension system according to claim 2, wherein the supporting bearing (24', 24''') consists of an elastomer material or a thermoplastic elastomer having a reinforcement (31, 35) applied to the outer side.

7. The pneumatic suspension system according to claim 6, wherein the applied reinforcement (31) consists of a textile material.

8. The pneumatic suspension system according to claim 5, wherein the textile material is present in a crossed, coiled, woven or knitted form.

9. The pneumatic suspension system according to claim 6, wherein the applied reinforcement (35) is a ring-shaped support element.

10. The pneumatic suspension system according to claim 9, wherein the support element (35) is made of metal or plastic.

11. The pneumatic suspension system according to claim 9, wherein the support element (35) is located in an outer nut (34) of the supporting bearing (24'''), said groove extending all around.

12. The pneumatic suspension system according to claim 2, wherein the pneumatic suspension bellows (7) and the supporting bearing (24, 4', 4", 24''') form a total composite of which the common contact surface (27) is free of adhesion.

13. The pneumatic suspension system according claim 2, wherein the fastening means (28) for securing the end (23) of the pneumatic suspension bellows (7) on the pneumatic suspension cover (2) is at the same time the fastening means for securing a first end (25) of the supporting bearing (24, 24', 24", 24''').

14. The pneumatic suspension system according to claim 2, comprising a pneumatic suspension bellows (7) with an external guide (10), in conjunction with an axial bellows.

15. The pneumatic suspension system according to claim 14, wherein the external guide (10) is at the same time the fastening means for securing a second end (26) of the supporting bearing (24) in that a relevant end of the supporting bearing is clamped between the pneumatic suspension bellows (7) and the external guide when pressure is admitted.

16. The pneumatic suspension system according to claim 14, wherein a second end (26) of the supporting bearing (24, 24', 24", 24''') is secured on an outer guide (10) with the use of an additional fastening means (30).

17. The pneumatic suspension-system according to claim 16, wherein the second end (26) of the supporting bearing (24, 24') exclusively comes to rest between the additional fastening means (30) and the external guide (10).

18. The pneumatic suspension system according to claim 16, wherein the second end (26) of the supporting bearing (24", 24''') comprises a slot-shaped groove extending all around for receiving the external guide (10), with formation of an inner end (32) and an outer end (33), whereby the inner end is located between the pneumatic suspension bellows (7) and the external guide (10), whereas the outer end comes to rest between the external guide and the additional fastening means (30).

19. The pneumatic suspension system according to claim 14, wherein within the zone where a second end (26) of the supporting beam (24, 24", 24''') is secured, the external guide (10) comprises an outwardly directed end flange (29).

20. The pneumatic suspension system according to claim 1, wherein the pneumatic suspension bellows (7) and the articulated component (22') form a one-piece total composite, in such a way that the articulation area (A) has a different structure versus the remaining zone (B) of the bellows, in conjunction with another structure of the reinforcement.

21. The pneumatic suspension system according to claim 20, wherein the articulated component (22') comprises an embedded reinforcement and/or a reinforcement applied to the outer side, said reinforcement consisting of a textile material in the coiled, woven or knitted form.

22. The pneumatic suspension system according to claim 20, comprising a cross-layered bellows (7') without an outer guide.

23. The pneumatic suspension system according to claim 1, in combination with a front axle of a motor vehicle.

* * * * *